(12) United States Patent
Pritchard

(10) Patent No.: US 10,821,791 B2
(45) Date of Patent: Nov. 3, 2020

(54) TRAILER HITCH SECURITY SYSTEM

(71) Applicant: James Craig Pritchard, Magnolia, TX (US)

(72) Inventor: James Craig Pritchard, Magnolia, TX (US)

( * ) Notice: Subject to any disclaimer, the term of this patent is extended or adjusted under 35 U.S.C. 154(b) by 0 days.

(21) Appl. No.: 15/148,581

(22) Filed: May 6, 2016

(65) Prior Publication Data
US 2017/0320364 A1    Nov. 9, 2017

(51) Int. Cl.
*B60D 1/60*     (2006.01)

(52) U.S. Cl.
CPC .................... *B60D 1/60* (2013.01)

(58) Field of Classification Search
CPC .................. B60D 1/60; E05B 73/00
See application file for complete search history.

(56) References Cited

U.S. PATENT DOCUMENTS

| | | | | |
|---|---|---|---|---|
| 3,605,457 A * | 9/1971 | Foster | ...................... | B60D 1/60 280/507 |
| 3,884,055 A * | 5/1975 | Vuillemot | ................ | B60D 1/60 280/507 |
| 4,141,569 A * | 2/1979 | Dilk | ........................ | B60D 1/60 280/507 |
| 4,730,841 A * | 3/1988 | Ponder | ..................... | B60D 1/60 280/501 |
| 4,836,570 A * | 6/1989 | Lopez | ...................... | B60D 1/60 280/507 |
| 5,584,495 A * | 12/1996 | Mason | | |
| 5,775,139 A * | 7/1998 | Sellers | ..................... | B60D 1/60 280/507 |
| 5,794,961 A * | 8/1998 | Niswanger | ............. | B60D 1/065 280/507 |
| 6,019,337 A * | 2/2000 | Brown | ..................... | B60D 1/60 248/352 |
| 6,070,441 A * | 6/2000 | Bernstrom | | |
| 6,694,781 B1 * | 2/2004 | Li | | |
| 7,107,799 B1 * | 9/2006 | Marley | .................... | B60D 1/60 280/507 |
| 8,556,288 B1 * | 10/2013 | Bale | ......................... | B60D 1/60 280/507 |
| 9,033,358 B1 * | 5/2015 | Williamson | ............. | B60D 1/60 280/507 |
| 9,242,522 B2 * | 1/2016 | Breeden, III | | |
| 2008/0067783 A1 * | 3/2008 | Rousseau | ................. | B60D 1/60 280/507 |
| 2010/0230932 A1 * | 9/2010 | Pratt | ....................... | B60D 1/06 280/507 |

* cited by examiner

*Primary Examiner* — Jacob D Knutson
*Assistant Examiner* — Michael R Stabley
(74) *Attorney, Agent, or Firm* — David G. Henry, Sr.

(57) ABSTRACT

A trailer hitch security system for blocking access to a trailer hitch, includes a breach-resistant enclosure within which is positioned hitch engagement means (such as a hitch ball). A locking rod is configured for extending through orifices formed in the enclosure, for reversibly locking into position, and, when in-place, preventing removal of any engaged trailer hitch. Shrouds surround the orifices to prevent access to the termini of the locking rod to further impede tampering or attempted removal of the locking rod.

12 Claims, 1 Drawing Sheet

TRAILER HITCH SECURITY SYSTEM

BACKGROUND OF THE INVENTION

1. Field of the Invention

The present invention relates to physical security devices, and more particular to security devices and systems for physically securing trailers, by blocking interface with a trailer's hitch.

2. Background Information

As any Internet search will reveal, trailer there is a long existing and pervasive problem. The problem is both reflected by as well as the offering by many insurance companies of insurance against such theft.

Many devices are offered for securing trailers, including some exemplified by the disclosures of U.S. Pat. Nos. 5,584,495, 5,573,263, and 6,070,441.

These devices (the only ones reviewed in a cursory search for examples for this Background Section) are either complex to the point of impracticability of cost or use, or are easily defeated by thieves.

Because trailer theft can result in impact ranging from inconvenience to life-altering losses (such as when a trailer containing irreplaceable, personal treasures is lost during a move, for example), a device or system is still believed needed to effectively deter trailer theft, while remaining cost-effective and easy to use.

SUMMARY OF THE INVENTION

In view of the foregoing, the present invention is of a configuration for a trailer hitch security device that is highly theft-resistant, and easy to use. The design eliminates components (such as the use of pad locks) that can easily be breached with as simple as bolt cutters, but without adding complexity of design or use, provides a high degree of theft deterrence.

In summary, the present design for a trailer hitch security device includes a highly durable receptacle in which a fishbowl is secured and Interface means for a retaining that secures the engaged hitch within the receptacle, in turn itself secured through use of a rod terminus locking device that lacks the hasp that is so often are easily cut in defeating other hitch locking systems.

BRIEF DESCRIPTION OF THE DRAWINGS

The following figures depict a preferred embodiment of the present invention, with variations in other embodiments not depicted being nonetheless covered by the claims as are ultimately allowed in the resulting patent.

DETAILED DESCRIPTION OF THE PREFERRED EMBODIMENT

Figure 2:
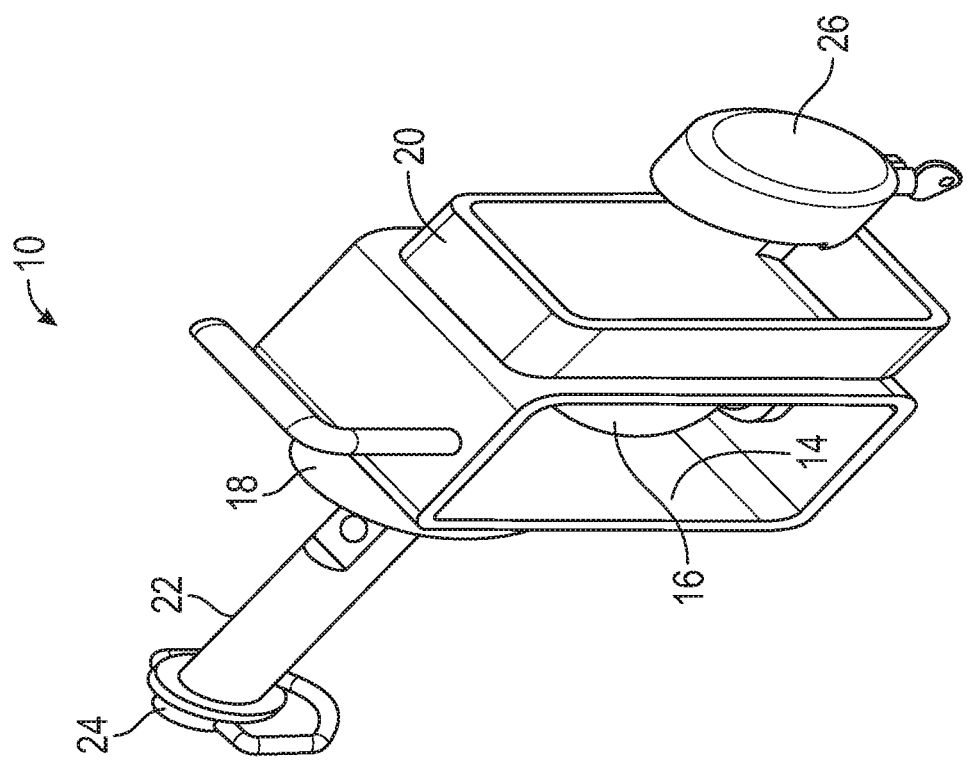
FIG. 2 is a perspective view, from a different vantage, of the preferred embodiment of the trailer hitch security device of the present invention as depicted in FIG. 1.

Referring to figures one and two, the trailer hitch security device of the present invention is identified generally by reference 10. Device 10 includes a receptacle 12 which is, and the preferred embodiment, fabricated from hardened steel of at least one quarter inch thickness. Receptacle 12 in this embodiment is a box-like structure having one open face 14. Securely situated within the interior space 13 defined by receptacle 12 is a "dummy" hitch ball 16 with which a trailer hitch (not shown) will be engaged during use of device 10. For other than a ball-type hitch, an alternative hitch engagement means (not separately shown) could be substituted for hitch ball 16.

Figure 1:
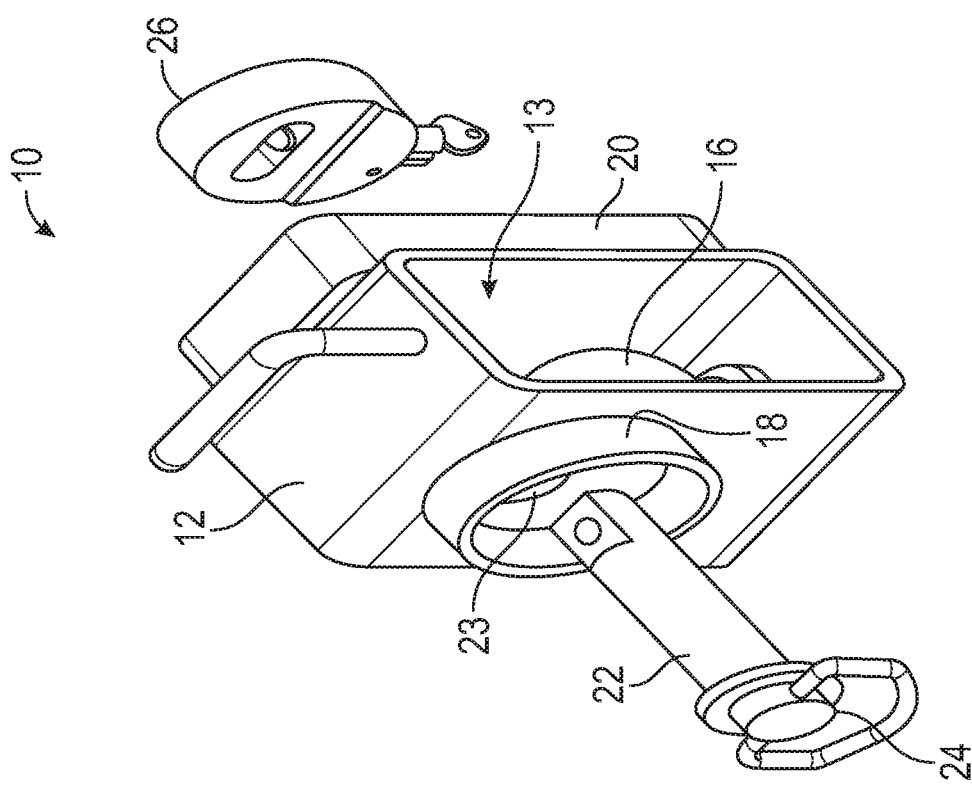
FIG. 1 is a perspective view of the preferred embodiment of the trailer hitch security device of the present invention.

Securely affixed to two opposing faces of receptacle 12 are locking rod shrouds 18 and 20. Positioned within the bounds of locking rod shrouds 18 and 20 are orifices 23 sized for passage there through of locking rod 22 (only orifice 23 situated within locking rod shroud 18 is depicted in FIG. 1, but a corresponding orifice is likewise situated within the bounds of locking rod shroud 20). Orifices 23 are positioned, in the preferred embodiment on opposing faces of receptacle 12, substantially centered on a common axis (not shown), such that a locking rod 22 (discussed below) may pass into a first orifice 23, though interior space 13 of receptacle 12, and out through, and extending beyond the opposing orifice 23. Of course, if for some reason a locking rod, having termini other than as lying on a shared axis, would be preferably, orifices 23 may be adjusted to accommodate such an alteration.

Locking rod 22 is also, in the preferred embodiment, fabricated from hardened steel. At a first terminus of locking rod 22 is a handle structure 24 (or merely an enlargement—a "stop"—to prevent passage through a locking rod orifice 23), when locking rod is positioned for extending into first locking rod orifice 23, through the interior space 13 of receptacle 12, and with the second, opposite terminus of locking rod 22 extending through and slightly beyond second locking rod orifice 23 (not shown) for engagement with locking means. In the preferred embodiment, such locking means is in the form of a rod terminus locking device (of "locking cap") 26. When secured with locking cap 26, locking rod 22 cannot be removed from its engagement with receptacle 12. Because of the relative positioning of hitch ball 16 (or alternative embodiment) within receptacle 12, and that of locking rod 22 as determined by the positioning of locking rod orifices 23, a trailer hitch cannot be disengaged from hitch ball 16 when locking rod 22 is locked in-place.

In the depicted embodiment, locking rod 22 and rod terminus locking device 26 are respectively configured whereby, without any exposed lock hasp, the rod terminus locking device 26 securely engages with the correspondingly configured locking rod terminus. Locking rod 22 is of a length that, when so configured, both the handle structure 24 and the rod terminus locking device 26 reside within the bounds of locking rod shrouds 18 and 20, and are closely juxtaposed, or actually in contact with the surfaces surrounding orifices 23. This arrangement provides for considerable enhanced security against attempted breach of the security system. Not only is the locking device itself highly theft resistant through use of typical breach devices (such as bolt cutters), but the locking rod shrouds 18 and 20 prevent access of any other self-destructive devices. Once locked in-place, locking rod 22 prevents removal of any engaged hitch, and is highly resistant to removal to permit such removal.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention.

It is, therefore, contemplated that the appended claims will cover such modifications that fall within the scope of the invention.

I claim:

1. A trailer hitch security system comprising:
a monolithic receptacle defining an interior space, said receptacle having only one open face defining a hitch opening into said interior space, said receptacle having a completely closed face opposite said one open face defined by a permanently affixed back surface to prevent access to said interior space, said receptacle further having defined at first and second surface portions, respectively, first and second locking rod orifices;
hitch engagement means secured within said interior space for reversibly engaging with a trailer hitch; and
a locking rod having first and second locking rod termini, said locking rod having at said first locking rod termini stop means for impeding passage therethrough of said first locking rod termini, and having at said second locking rod termini lock engagement means for reversible locking engagement with locking means, said termini lock engagement means being sized and shaped for passage through said first and said second locking rod orifices, said locking rod being of a length for extending through said first and said second locking rod orifices, with said stop means at said first locking rod terminus being positioned substantially juxtaposed to an outer surface of said receptacle adjacent to said first locking rod orifice, and said termini lock engagement means being positioned substantially juxtaposed to an outer surface of said receptacle adjacent to said second locking rod orifice.

2. The system of claim 1 wherein said locking means is a locking cap which reversibly engages with said second locking rod terminus.

3. The system of claim 2 wherein said hitch engagement means is a hitch ball secured within said interior space of said receptacle.

4. The system of claim 1 wherein said hitch engagement means is a hitch ball secured within said interior space of said receptacle.

5. The system of claim 4 wherein said locking means is a locking cap which reversibly engages with said second locking rod terminus.

6. The system of claim 4 further comprising a locking rod orifice shroud positioned on said outer surface of said receptacle adjacent to said first locking rod orifice.

7. The system of claim 4 further comprising a locking rod orifice shroud positioned on said outer surface of said receptacle adjacent to said second locking rod orifice.

8. The system of claim 4 further comprising:
a first locking rod orifice shroud positioned on said outer surface of said receptacle adjacent to said first locking rod orifice; and
a second locking rod orifice shroud positioned on said outer surface of said receptacle adjacent to said second locking rod orifice.

9. The system of claim 1 further comprising a locking rod orifice shroud positioned on said outer surface of said receptacle adjacent to said first locking rod orifice.

10. The system of claim 1 further comprising a locking rod orifice shroud positioned on said outer surface of said receptacle adjacent to said second locking rod orifice.

11. The system of claim 1 further comprising:
a first locking rod orifice shroud positioned on said outer surface of said receptacle adjacent to said first locking rod orifice; and
a second locking rod orifice shroud positioned on said outer surface of said receptacle adjacent to said second locking rod orifice.

12. A trailer hitch security system comprising:
a monolithic receptacle defining an interior space, said receptacle having only one open face defining a hitch opening into said interior space, said receptacle having a completely closed face opposite said one open face defined by a permanently affixed back surface to prevent access to said interior space, said receptacle further having defined at first and second surface portions, respectively, first and second locking rod orifices;
hitch engagement means secured within said interior space for reversibly engaging with a trailer hitch;
a locking rod having first and second locking rod termini, said locking rod having at said first locking rod termini stop means for impeding passage therethrough of said first locking rod termini, and having at said second locking rod termini lock engagement means for reversible locking engagement with locking means, said termini lock engagement means being sized and shaped for passage through said first and said second locking rod orifices, said locking rod being of a length for extending through said first and said second locking rod orifices, with said stop means at said first locking rod terminus being positioned substantially juxtaposed to an outer surface of said receptacle adjacent to said first locking rod orifice, and said termini lock engagement means being positioned substantially juxtaposed to an outer surface of said receptacle adjacent to said second locking rod orifice; and
a first locking rod orifice shroud protruding from and affixed to said outer surface of said receptacle adjacent to said first locking rod orifice.

* * * * *